(12) United States Patent
Raghavan et al.

(10) Patent No.: US 11,009,339 B2
(45) Date of Patent: May 18, 2021

(54) MEASUREMENT OF THICKNESS OF THERMAL BARRIER COATINGS USING 3D IMAGING AND SURFACE SUBTRACTION METHODS FOR OBJECTS WITH COMPLEX GEOMETRIES

(71) Applicant: Applied Materials, Inc., Santa Clara, CA (US)

(72) Inventors: Kamala Chakravarthy Raghavan, Santa Clara, CA (US); David Alexander Britz, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 33 days.

(21) Appl. No.: 16/268,446

(22) Filed: Feb. 5, 2019

(65) Prior Publication Data

US 2020/0064121 A1    Feb. 27, 2020

Related U.S. Application Data

(60) Provisional application No. 62/770,129, filed on Nov. 20, 2018, provisional application No. 62/722,008, filed on Aug. 23, 2018.

(51) Int. Cl.
| | | |
|---|---|---|
| *G01B 11/06* | (2006.01) | |
| *G06K 7/14* | (2006.01) | |
| *G01B 11/25* | (2006.01) | |

(52) U.S. Cl.
CPC ...... *G01B 11/0625* (2013.01); *G01B 11/2518* (2013.01); *G06K 7/1417* (2013.01)

(58) Field of Classification Search
CPC ............ G01B 11/0625; G01B 11/2518; G06K 7/1417
USPC ..... 356/625–640, 237.1–237.6, 239.1–239.8
See application file for complete search history.

(56) References Cited

U.S. PATENT DOCUMENTS

| | | | |
|---|---|---|---|
| 5,217,757 | A | 6/1993 | Olson et al. |
| 5,503,874 | A | 4/1996 | Ackerman et al. |
| 5,950,925 | A | 9/1999 | Fukunaga et al. |
| 6,042,898 | A | 3/2000 | Burns et al. |
| 6,156,382 | A | 12/2000 | Rajagopalan et al. |
| 6,162,715 | A | 12/2000 | Mak et al. |

(Continued)

FOREIGN PATENT DOCUMENTS

| | | |
|---|---|---|
| EP | 0387113 B1 | 12/1993 |
| EP | 2022868 A2 | 2/2009 |

(Continued)

OTHER PUBLICATIONS

PCT International Search Report and the Written Opinion for International Application No. PCT/US2019/041181; dated Oct. 25, 2019; 15 total pages.

(Continued)

*Primary Examiner* — Tri T Ton (74) *Attorney, Agent, or Firm* — Patterson + Sheridan LLP (57) ABSTRACT

Embodiments described herein relate to a non-destructive measurement device measurement device and a non-destructive measurement method for determining coating thickness of a three-dimensional (3D) object. In one embodiment, at least one first 3D image of an uncoated surface of the object and at least one second 3D image of a coated surface of the object are collected and analyzed to the determine the coating thickness of the object.

19 Claims, 7 Drawing Sheets

(56) References Cited

U.S. PATENT DOCUMENTS

| | | |
|---|---|---|
| 6,245,192 B1 | 6/2001 | Dhindsa et al. |
| 6,309,713 B1 | 10/2001 | Mak et al. |
| 6,332,926 B1 | 12/2001 | Pfaendtner et al. |
| 6,359,089 B2 | 3/2002 | Hung et al. |
| 6,379,466 B1 | 4/2002 | Sahin et al. |
| 6,402,898 B1 | 6/2002 | Brumer et al. |
| 6,437,066 B1 | 8/2002 | Hung et al. |
| 6,551,929 B1 | 4/2003 | Kori et al. |
| 6,607,976 B2 | 8/2003 | Chen |
| 6,620,670 B2 | 9/2003 | Song et al. |
| 6,620,723 B1 | 9/2003 | Byun et al. |
| 6,620,956 B2 | 9/2003 | Chen et al. |
| 6,630,244 B1 | 10/2003 | Mao et al. |
| 6,677,247 B2 | 1/2004 | Yuan et al. |
| 6,740,585 B2 | 5/2004 | Yoon et al. |
| 6,784,096 B2 | 8/2004 | Chen et al. |
| 6,797,340 B2 | 9/2004 | Fang et al. |
| 6,805,750 B1 | 10/2004 | Ristau et al. |
| 6,809,026 B2 | 10/2004 | Yoon et al. |
| 6,811,814 B2 | 11/2004 | Chen et al. |
| 6,821,891 B2 | 11/2004 | Chen et al. |
| 6,825,134 B2 | 11/2004 | Law et al. |
| 6,827,978 B2 | 12/2004 | Yoon et al. |
| 6,831,021 B2 | 12/2004 | Chua et al. |
| 6,833,161 B2 | 12/2004 | Wang et al. |
| 6,838,125 B2 | 1/2005 | Chung et al. |
| 6,846,516 B2 | 1/2005 | Yang et al. |
| 6,869,838 B2 | 3/2005 | Law et al. |
| 6,872,429 B1 | 3/2005 | Chen et al. |
| 6,905,939 B2 | 6/2005 | Yuan et al. |
| 6,911,391 B2 | 6/2005 | Yang et al. |
| 6,924,191 B2 | 8/2005 | Liu et al. |
| 6,936,538 B2 | 8/2005 | Byun |
| 6,939,801 B2 | 9/2005 | Chung et al. |
| 6,939,804 B2 | 9/2005 | Lai et al. |
| 6,951,804 B2 | 10/2005 | Seutter et al. |
| 6,972,267 B2 | 12/2005 | Cao et al. |
| 7,026,238 B2 | 4/2006 | Xi et al. |
| 7,041,335 B2 | 5/2006 | Chung |
| 7,049,226 B2 | 5/2006 | Chung et al. |
| 7,081,271 B2 | 7/2006 | Chung et al. |
| 7,101,795 B1 | 9/2006 | Xi et al. |
| 7,211,144 B2 | 5/2007 | Lu et al. |
| 7,211,508 B2 | 5/2007 | Chung et al. |
| 7,241,686 B2 | 7/2007 | Marcadal et al. |
| 7,244,683 B2 | 7/2007 | Chung et al. |
| 7,262,133 B2 | 8/2007 | Chen et al. |
| 7,264,846 B2 | 9/2007 | Chang et al. |
| 7,265,048 B2 | 9/2007 | Chung et al. |
| 7,279,432 B2 | 10/2007 | Xi et al. |
| 7,285,312 B2 | 10/2007 | Li |
| 7,317,229 B2 | 1/2008 | Hung et al. |
| 7,371,467 B2 | 5/2008 | Han et al. |
| 7,396,565 B2 | 7/2008 | Yang et al. |
| 7,404,985 B2 | 7/2008 | Chang et al. |
| 7,405,158 B2 | 7/2008 | Lai et al. |
| 7,416,979 B2 | 8/2008 | Yoon et al. |
| 7,429,402 B2 | 9/2008 | Gandikota et al. |
| 7,429,540 B2 | 9/2008 | Olsen |
| 7,439,191 B2 | 10/2008 | Law et al. |
| 7,473,655 B2 | 1/2009 | Wang et al. |
| 7,507,660 B2 | 3/2009 | Chen et al. |
| 7,531,468 B2 | 5/2009 | Metzner et al. |
| 7,547,952 B2 | 6/2009 | Metzner et al. |
| 7,569,501 B2 | 8/2009 | Metzner et al. |
| 7,573,586 B1 | 8/2009 | Boyer et al. |
| 7,585,762 B2 | 9/2009 | Shah et al. |
| 7,595,263 B2 | 9/2009 | Chung et al. |
| 7,601,652 B2 | 10/2009 | Singh et al. |
| 7,651,955 B2 | 1/2010 | Ranish et al. |
| 7,732,327 B2 | 6/2010 | Lee et al. |
| 7,737,028 B2 | 6/2010 | Wang et al. |
| 7,776,395 B2 | 8/2010 | Mahajani |
| 7,816,200 B2 | 10/2010 | Kher |
| 7,824,743 B2 | 11/2010 | Lee et al. |
| 7,833,358 B2 | 11/2010 | Chu et al. |
| 7,846,840 B2 | 12/2010 | Kori et al. |
| 7,867,900 B2 | 1/2011 | Lee et al. |
| 7,875,119 B2 | 1/2011 | Gartland et al. |
| 7,910,165 B2 | 3/2011 | Ganguli et al. |
| 7,910,446 B2 | 3/2011 | Ma et al. |
| 7,964,505 B2 | 6/2011 | Khandelwal et al. |
| 7,972,978 B2 | 7/2011 | Mahajani |
| 8,043,907 B2 | 10/2011 | Ma et al. |
| 8,056,652 B2 | 11/2011 | Lockwood et al. |
| 8,227,078 B2 | 7/2012 | Morra et al. |
| 8,277,670 B2 | 10/2012 | Heo et al. |
| 8,470,460 B2 | 6/2013 | Lee |
| 8,741,420 B2 | 6/2014 | Bunker et al. |
| 8,871,297 B2 | 10/2014 | Barnett et al. |
| 9,255,327 B2 | 2/2016 | Winter et al. |
| 9,683,281 B2 | 6/2017 | Meehan et al. |
| 9,777,583 B2 | 10/2017 | Leggett |
| 9,873,940 B2 | 1/2018 | Xu et al. |
| 10,287,899 B2 | 5/2019 | Dierberger |
| 10,369,593 B2 | 8/2019 | Barnett et al. |
| 10,633,740 B2 | 4/2020 | Melnik et al. |
| 2002/0002258 A1 | 1/2002 | Hung et al. |
| 2002/0045782 A1 | 4/2002 | Hung et al. |
| 2002/0117399 A1 | 8/2002 | Chen et al. |
| 2002/0127336 A1 | 9/2002 | Chen et al. |
| 2003/0010451 A1 | 1/2003 | Tzu et al. |
| 2003/0057526 A1 | 3/2003 | Chung et al. |
| 2003/0059535 A1 | 3/2003 | Luo et al. |
| 2003/0059538 A1 | 3/2003 | Chung et al. |
| 2003/0072884 A1 | 4/2003 | Zhang et al. |
| 2003/0082301 A1 | 5/2003 | Chen et al. |
| 2003/0123216 A1 | 7/2003 | Yoon et al. |
| 2003/0124262 A1 | 7/2003 | Chen et al. |
| 2003/0132319 A1 | 7/2003 | Hytros et al. |
| 2003/0136520 A1 | 7/2003 | Yudovsky et al. |
| 2003/0139005 A1 | 7/2003 | Song et al. |
| 2003/0157760 A1 | 8/2003 | Xi et al. |
| 2003/0172872 A1 | 9/2003 | Thakur et al. |
| 2003/0198754 A1 | 10/2003 | Xi et al. |
| 2003/0203616 A1 | 10/2003 | Chung et al. |
| 2003/0215570 A1 | 11/2003 | Seutter et al. |
| 2003/0235961 A1 | 12/2003 | Metzner et al. |
| 2004/0009665 A1 | 1/2004 | Chen et al. |
| 2004/0013803 A1 | 1/2004 | Chung et al. |
| 2004/0018738 A1 | 1/2004 | Liu |
| 2004/0079648 A1 | 4/2004 | Khan et al. |
| 2004/0171280 A1 | 9/2004 | Conley et al. |
| 2005/0003310 A1 | 1/2005 | Bai et al. |
| 2005/0008780 A1 | 1/2005 | Ackerman et al. |
| 2005/0019593 A1 | 1/2005 | Mancini et al. |
| 2005/0053467 A1 | 3/2005 | Ackerman et al. |
| 2005/0085031 A1 | 4/2005 | Lopatin et al. |
| 2005/0158590 A1 | 7/2005 | Li |
| 2005/0255329 A1 | 11/2005 | Hazel |
| 2005/0260347 A1 | 11/2005 | Narwankar et al. |
| 2005/0260357 A1 | 11/2005 | Olsen et al. |
| 2005/0271813 A1 | 12/2005 | Kher et al. |
| 2006/0019032 A1 | 1/2006 | Wang et al. |
| 2006/0019033 A1 | 1/2006 | Muthukrishnan et al. |
| 2006/0040052 A1 | 2/2006 | Fang et al. |
| 2006/0062917 A1 | 3/2006 | Muthukrishnan et al. |
| 2006/0084283 A1 | 4/2006 | Paranjpe et al. |
| 2006/0148180 A1 | 7/2006 | Ahn et al. |
| 2006/0153995 A1 | 7/2006 | Narwankar et al. |
| 2006/0228895 A1 | 10/2006 | Chae et al. |
| 2006/0246213 A1 | 11/2006 | Moreau et al. |
| 2006/0286819 A1 | 12/2006 | Seutter et al. |
| 2007/0009658 A1 | 1/2007 | Yoo et al. |
| 2007/0009660 A1 | 1/2007 | Sasaki et al. |
| 2007/0049043 A1 | 3/2007 | Muthukrishnan et al. |
| 2007/0054487 A1 | 3/2007 | Ma et al. |
| 2007/0065578 A1 | 3/2007 | McDougall |
| 2007/0099415 A1 | 5/2007 | Chen et al. |
| 2007/0134518 A1 | 6/2007 | Feist et al. |
| 2007/0202254 A1 | 8/2007 | Ganguli et al. |
| 2007/0259111 A1 | 11/2007 | Singh et al. |
| 2007/0274837 A1 | 11/2007 | Taylor et al. |
| 2008/0032510 A1 | 2/2008 | Olsen |

(56) References Cited

U.S. PATENT DOCUMENTS

| | | |
|---|---|---|
| 2008/0038578 A1 | 2/2008 | Li |
| 2008/0056905 A1 | 3/2008 | Golecki |
| 2008/0090425 A9 | 4/2008 | Olsen |
| 2008/0113095 A1 | 5/2008 | Gorman et al. |
| 2008/0135914 A1 | 6/2008 | Krishna et al. |
| 2008/0268154 A1 | 10/2008 | Kher et al. |
| 2008/0268635 A1 | 10/2008 | Yu et al. |
| 2009/0004386 A1 | 1/2009 | Makela et al. |
| 2009/0004850 A1 | 1/2009 | Ganguli et al. |
| 2009/0053426 A1 | 2/2009 | Lu et al. |
| 2009/0061613 A1 | 3/2009 | Choi et al. |
| 2009/0098289 A1 | 4/2009 | Deininger et al. |
| 2009/0098346 A1 | 4/2009 | Li |
| 2009/0155976 A1 | 6/2009 | Ahn et al. |
| 2009/0269507 A1 | 10/2009 | Yu et al. |
| 2009/0286400 A1 | 11/2009 | Heo et al. |
| 2010/0062149 A1 | 3/2010 | Ma et al. |
| 2010/0062614 A1 | 3/2010 | Ma et al. |
| 2010/0075999 A1 | 3/2010 | Olsen |
| 2010/0110451 A1* | 5/2010 | Biswas ............ G01B 11/25 356/631 |
| 2010/0120245 A1 | 5/2010 | Tjandra et al. |
| 2010/0159150 A1 | 6/2010 | Kirby et al. |
| 2010/0167627 A1 | 7/2010 | Wu et al. |
| 2010/0239758 A1 | 9/2010 | Kher et al. |
| 2010/0270609 A1 | 10/2010 | Olsen et al. |
| 2011/0043820 A1* | 2/2011 | Sansom ............ G01B 11/0616 356/503 |
| 2011/0175038 A1 | 7/2011 | Hou et al. |
| 2011/0293825 A1 | 12/2011 | Atwal et al. |
| 2012/0024403 A1 | 2/2012 | Gage et al. |
| 2012/0082783 A1 | 4/2012 | Barnett et al. |
| 2012/0148944 A1 | 6/2012 | Oh et al. |
| 2012/0276306 A1 | 11/2012 | Ueda |
| 2012/0318773 A1 | 12/2012 | Wu et al. |
| 2013/0048605 A1 | 2/2013 | Sapre et al. |
| 2013/0164456 A1 | 6/2013 | Winter et al. |
| 2013/0292655 A1 | 11/2013 | Becker et al. |
| 2014/0103284 A1 | 4/2014 | Hsueh et al. |
| 2014/0264297 A1 | 9/2014 | Kumar et al. |
| 2014/0271220 A1 | 9/2014 | Leggett |
| 2015/0017324 A1 | 1/2015 | Barnett et al. |
| 2015/0184296 A1 | 7/2015 | Xu et al. |
| 2015/0221541 A1 | 8/2015 | Nemani et al. |
| 2016/0010472 A1 | 1/2016 | Murphy et al. |
| 2016/0251972 A1 | 9/2016 | Dierberger |
| 2016/0281230 A1 | 9/2016 | Varadarajan et al. |
| 2016/0298222 A1 | 10/2016 | Meehan et al. |
| 2016/0300709 A1 | 10/2016 | Posseme et al. |
| 2016/0328635 A1* | 11/2016 | Dave ................ G06K 9/20 |
| 2017/0076968 A1 | 3/2017 | Wang et al. |
| 2017/0084425 A1 | 3/2017 | Uziel et al. |
| 2017/0213570 A1 | 7/2017 | Cheng et al. |
| 2017/0233930 A1 | 8/2017 | Keuleers et al. |
| 2017/0292445 A1 | 10/2017 | Nelson et al. |
| 2017/0314125 A1 | 11/2017 | Fenwick et al. |
| 2018/0006215 A1 | 1/2018 | Jeong et al. |
| 2018/0105932 A1 | 4/2018 | Fenwick et al. |
| 2018/0127868 A1 | 5/2018 | Xu et al. |
| 2018/0261516 A1 | 9/2018 | Lin et al. |
| 2018/0261686 A1 | 9/2018 | Lin et al. |
| 2018/0329189 A1 | 11/2018 | Banna et al. |
| 2018/0339314 A1 | 11/2018 | Bhoyar et al. |
| 2018/0351164 A1 | 12/2018 | Hellmich et al. |
| 2018/0358229 A1 | 12/2018 | Koshizawa et al. |
| 2019/0019690 A1 | 1/2019 | Choi et al. |
| 2019/0032194 A2 | 1/2019 | Dieguez-Campo et al. |
| 2019/0041192 A1* | 2/2019 | Bourne ............ F01D 5/288 |
| 2019/0079388 A1 | 3/2019 | Fender et al. |
| 2019/0088543 A1 | 3/2019 | Lin et al. |
| 2019/0130731 A1 | 5/2019 | Hassan et al. |
| 2019/0271076 A1 | 9/2019 | Fenwick et al. |
| 2019/0284686 A1 | 9/2019 | Melnik et al. |
| 2019/0284692 A1 | 9/2019 | Melnik et al. |
| 2019/0284694 A1 | 9/2019 | Knisley et al. |
| 2019/0287808 A1 | 9/2019 | Goradia et al. |
| 2019/0311900 A1 | 10/2019 | Pandit et al. |
| 2019/0311909 A1 | 10/2019 | Bajaj et al. |
| 2019/0382879 A1 | 12/2019 | Jindal et al. |
| 2020/0027767 A1 | 1/2020 | Zang et al. |
| 2020/0043722 A1 | 2/2020 | Cheng et al. |
| 2020/0240018 A1 | 7/2020 | Melnik et al. |
| 2020/0361124 A1 | 11/2020 | Britz |
| 2020/0392626 A1 | 12/2020 | Chatterjee et al. |

FOREIGN PATENT DOCUMENTS

| | | |
|---|---|---|
| EP | 2103707 A1 | 9/2009 |
| EP | 2392895 A1 | 12/2011 |
| EP | 2161352 B1 | 2/2014 |
| JP | 2823086 B2 | 11/1998 |
| JP | 2001342556 A | 12/2001 |
| JP | 2003013745 A | 1/2003 |
| JP | 2006199988 A | 8/2006 |
| KR | 20060106104 A | 10/2006 |
| KR | 20110014989 A | 2/2011 |
| RU | 2630733 C2 | 9/2017 |
| WO | 00/09778 A1 | 2/2000 |
| WO | 2005059200 A1 | 6/2005 |
| WO | 2014159267 A1 | 10/2014 |
| WO | 2015047783 A1 | 4/2015 |

OTHER PUBLICATIONS

Lang "The Role of Active Elements in the Oxidation Behaviour of High Temperature Metals and Alloys" Elsevier, 1989, pp. 111-129 and 153.

International Search Report and Written Opinion dated Jul. 2, 2019 for Application No. PCT/US2019/022788.

International Search Report and Written Opinion for International Application No. PCT/US2019/022737 dated Jul. 2, 2019, 11 pages.

"A Review on Alumina-Chrome ($Al_2O_3$—$Cr_2O_3$) and Chrome-Silica ($Cr_2O_3$—$SiO_2$) Refractories along with their Binary Phase Diagrams," Nov. 18, 2009, 6 pages, <http://www.idc-online.com/technical_references/pdfs/chemical_engineering/A_Review_on_Alumina_Chrome.pdf>.

Bensch et al. "Modeling of the Influence of Oxidation of Thin-Walled Specimens of Single Crystal Superalloys," Superalloys 2012: 12th International Symposium on Superalloys, The Minerals, Metals & Materials Society, pp. 331-340, <https://www.tms.org/superalloys/10.7449/2012/Superalloys_2012_331_340.pdf>.

Fujita et al. "Sintering of $Al_2O_3$—$Cr_2O_3$ Powder Prepared by Sol-Gel Process," Journal of the Society of Materials Science, Japan, vol. 56, No. 6, Jun. 2007, pp. 526-530, <http://www.ecm.okayama-u.ac.jp/ceramics/Research/Papers/2007/Fujita_JSMS56(2007)526.pdf>.

Hirata et al. "Corrosion Resistance of Alumina-Chromia Ceramic Materials against Molten Slag," Materials Transactions, vol. 43, No. 10, 2002, pp. 2561-2567, <https://www.jim.or.jp/journal/e/pdf3/43/10/2561.pdf>.

Knisley et al. "Volatility and High Thermal Stability in Mid to Late First Row Transition Metal Diazadienyl Complexes," Organometallics, 2011, vol. 30, No. 18, pp. 5010-5017.

Pettit et al. "Oxidation and Hot Corrosion of Superalloys," Jan. 1984, The Metal Society AIME, Warrendale, PA, pp. 651-687, <http://www.tms.org/superalloys/10.7449/1984/Superalloys_1984_651_687_pdf>.

Tsai et al. "Growth mechanism of $Cr_2O_3$ scales: oxygen and chromium diffusion, oxidation kinetics and effect of yttrium," Materials Science and Engineering A, vol. 212, No. 1, pp. 6-13, 1996, <https://doi.org/10.1016/0921-5093(96)10173-8>.

He et al. "Role of annealing temperatures on the evolution of microstructure and properties of $Cr_2O_3$ films," Applied Surface Science, vol. 357, Part B, Dec. 1, 2015, pp. 1472-1480, <https://doi.org/10.1016/j.apsusc.2015.10.023>.

International Search Report and Written Opinion for International Application No. PCT/US2019/022709 dated Jun. 28, 2019, 13 pages.

(56) References Cited

OTHER PUBLICATIONS

Kaloyeros et al. "Review—Silicon Nitrtide and Silicon Nitride-Rich Thin Film Technologies: Trends in Deposition Technniques and Related Application". ECS Journal of Solid State Science and Technology, 6 (10) p. 691-p. 714 (2017).
Heidary et al. "Study on the behavior of atomic layer deposition coatings on a nickel substrate at high temperature," Nanotechnology, 27, 245701, 2016, pp. 1-32.
Vargas Garcia et al. "Thermal barrier coatings produced by chemical vapor deposition," Science and Technology of Advanced Materials, vol. 4, No. 4, 2003, pp. 397-402.
Dyer et al. "CVD Tungsten Carbide and Titanium Carbide Coatings for Aerospace Components," SAE Transactions, vol. 98, Section 1: Journal of Aerospace (1989), pp. 64-70. Abstract Only.
International Search Report and Written Opinion dated Jul. 6, 2020 for Application No. PCT/US2020/024285.
PCT Notification of Transmittal of the International Search Report and the Written Opinion of the International Searching Authority for International Application No. PCT/US2019/019113; dated Jun. 10, 2019; 11 total pages.
Taiwan Office Action dated Apr. 22, 2020 for Application No. 108106406.
International Search Report and Written Opinion dated Jun. 24, 2020 for Application No. PCT/US2020/019151.
Liu et al., "Ultrathin high-temperature oxidation-resistant coatings of hexagonal boron nitride" Nature Communications; doi: 10.1038/ncomms3541; Pub. Oct. 4, 2013, 8 pages.
Calderon, "Boron Nitride Growth and Electronics", Cornell University, May 2018.
W. Auwarter, "Hexagonal boron nitride monolayers on metal supports: Versatile templates for atoms, molecules and nanostructures", Surface Science Reports 74 (2019) 1-95.
International Search Report and Written Report dated Jul. 31, 2020 for Application No. PCT/US2020/027247.
International Search Report/Written Opinion issued to PCT/US2020/028462 dated Jul. 29, 2020.
Leppaniemi, Jarmo, et al., "Corrosion protection of steel with multilayer coatings: Improving the sealing properties of physical vapor deposition CrN coatings with Al2O3/Ti02atomic layer deposition nanolaminates". Thin Solid Films 627 (2017) pp. 59-68.
Ali, Muhammad Rostom, et al., "Electrodeposition of aluminum-chromium alloys from Al&BPC melt and its corrosion and high temperature oxidation behaviors". Electrochimica Acta, vol. 42. No. 15., pp. 2347-2354, 1997.
Wu, Yanlin, et al., "Atomic Layer Deposition from Dissolved Precursors". Nano Letters 2015, 15, 6379-6385.
Johnson, Andrew L., et al., "Recent developments in molecular precursors for atomic layer deposition". Organomet. Chem., 2019, 42, 1-53.
Haukka, Suvi, et al., "Chemisorption of chromium acetylacetonate on porous high surface area silica". Applied Surface Science, vol. 75, Issues 1-4, Jan. 2, 1994, pp. 220-227. Abstract Only.
International Search Report and Written Opinion dated Oct. 30, 2020 for Application No. PCT/US2020/041382.
Taiwan Office Action dated Dec. 21, 2020 for Application No. 109113600.
International Search Report and Written Opinion dated Feb. 2, 2021 for Application No. PCT/US2020/056618.

\* cited by examiner

FIG. 5

MEASUREMENT OF THICKNESS OF THERMAL BARRIER COATINGS USING 3D IMAGING AND SURFACE SUBTRACTION METHODS FOR OBJECTS WITH COMPLEX GEOMETRIES

CROSS-REFERENCE TO RELATED APPLICATIONS

This application claims benefit of U.S. Provisional Patent Application Ser. No. 62/722,008, filed Aug. 23, 2018, and U.S. Provisional Patent Application Ser. No. 62/770,129, filed Nov. 20, 2018 which are herein incorporated by reference.

BACKGROUND

Field

Embodiments of the present disclosure generally relate to determining thickness of three-dimensional (3D) object coatings. More particularly, embodiments of the present disclosure relate to determining thickness of protective coatings for turbine blades and other components exposed to corrosive enviroments.

Description of the Related Art

Aerospace components including turbine vanes and blades are fabricated from nickel and cobalt-based superalloys. Superalloy protection during engine operation employs a plurality of layers, including a stable oxide scale that is dense, adheres to the surface or surfaces of the component, and is stable at high temperatures up to about 1900° C. Various barrier coatings, including thermal barrier coatings (TBCs), can be used to inhibit oxidation and corrosion of the aerospace components. Various materials are employed to form these corrosion-resistant coatings, such as native-grown oxides include $Cr_2O_3$ for hot corrosion protection and $Al_2O_3$ for oxidation resistance. TBCs and other barrier coatings can be deposited using either e-beam PVD or thermal spray. Deposited TBCs include yttria-stabilized zirconia, gadolinium zirconate, tantalum-yttrium zirconium oxides, and other mixed zirconate, halfnate, silicate, and aluminate compounds. However, measuring TBC thickness on three-dimensional (3D) objects may be destructive, inaccurate, costly, and time-consuming.

Thus, there remains a need in the art for measuring coating thicknesses of 3D objects with non-destructive imaging methods.

SUMMARY

In one embodiment, a method of determining a thickness of an object coating is provided. The method includes, in a non-destructive measurement device having at least one image sensor system, positioning an uncoated surface of an object in a field view of the at least one image sensor system. The object has one or more surfaces. A first 3D image of the uncoated surface is collected without chemically or physically changing the one or more surfaces of the object. The first 3D image corresponds to a first surface profile of the uncoated surface. A coated surface of the object is positioned in the field view of the at least one image sensor system. A second 3D image of the coated surface is collected without chemically or physically changing the one or more surfaces of the object. The second 3D image corresponds to a second surface profile of the coated surface. The first 3D image and the second 3D image are analyzed.

In another embodiment, a method of determining a thickness of an object coating is provided. The method includes in a non-destructive measurement device having at least one image sensor system, positioning a surface of an object in a field view of the at least one image sensor system. The object has one or more surfaces and the surface having a uncoated portion and a coated portion. A 3D image of the surface is collected without chemically or physically changing the one or more surfaces of the object. The 3D image corresponds to a first surface profile of the uncoated portion and a second surface profile of the coated portion. The 3D image is analyzed.

In yet another embodiment, a non-destructive measurement device is provided. The non-destructive measurement device includes a body, a stage assembly disposed in the body having a stage configured to retained an object and a coordinate grid, an image sensor assembly disposed in the body, an alignment mechanism disposed in the body, and a controller. Each of the one or more image sensor systems has an illumination unit, one or more image sensors, and a Quick Response (QR) code reader. The alignment mechanism operable to align position the object at an alignment position on the coordinate grid. The alignment position corresponds to the QR code of the object. The controller is coupled to the stage assembly, the image sensor assembly, and the alignment mechanism. The controller is interfaced with a coating system and controls automation integration with the coating system via a system controller of the coating system. The controller is configured to instruct the one or more image sensor systems to collect one or more 3D images of one or more surfaces of the object analyze the one or more 3D images to obtain a thickness of a coating of the object.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to a non-destructive measurement device measurement device and a non-destructive measurement method for determining coating thickness of a three-dimensional (3D) object.

Figure 1:
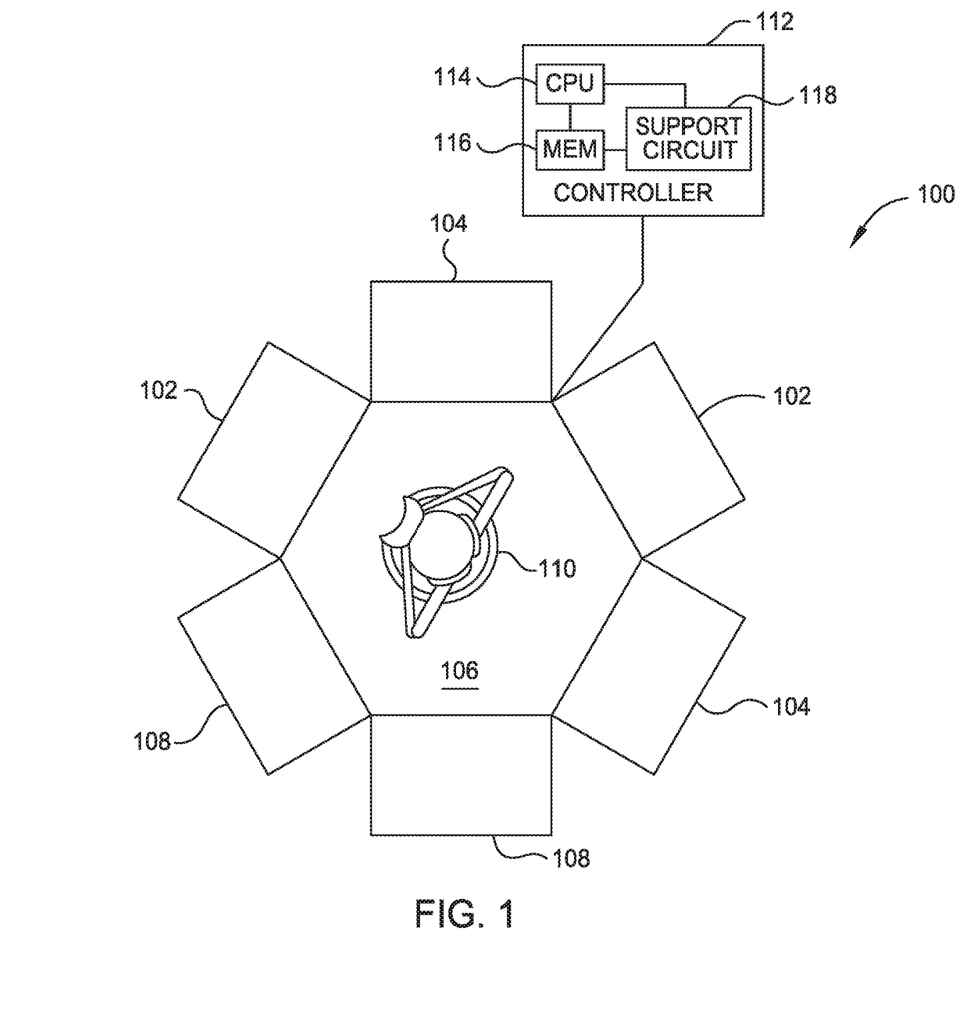
FIG. 1 is a schematic view of a coating system having an at least one integrated non-destructive measurement device according to an embodiment.

FIG. 1 is a schematic view of a coating system 100 having an at least one integrated non-destructive measurement device 102. Additionally, the non-destructive measurement device 102 may be provided as a standalone device unattached and remote from the system 100. The system 100 and the integrated non-destructive measurement device 102 are utilized for coating 3D objects and measuring coating thicknesses on 3D objects with non-destructive imaging methods. It is to be understood that the system described below is an exemplary system and other systems, including systems from other manufacturers, may be used with or modified to accomplish aspects of the present disclosure. The system 100 includes one or more non-destructive measurement devices 102 and one or more of coating modules 104 coupled to a transfer chamber 106. In one embodiment, which can be combined with other embodiments described herein, the system 100 includes one or more processing modules 108 coupled to the transfer chamber 106. The one or more coating modules 104 are adapted for coating 3D objects. In one embodiment, which can be combined with other embodiments described herein, the 3D objects include aerospace components, such as turbine vanes and blades. In another embodiment, which can be combined with other embodiments described herein, the coatings are barrier coatings, such as thermal barrier coatings (TBCs). The one or more processing modules are adapted for processing the 3D objects, and the like. The transfer chamber 106 houses a transfer mechanism 110 used to transfer 3D objects between the measurement devices 102, coating modules 104, and processing modules 108.

A system controller 112 is coupled to and controls each module and measurement device 102 of the system 100. Generally, the system controller 112 may control all aspects of operation of the system 100 using a direct control of modules and measurement devices 102 of the system 100 or, alternatively, by controlling the computers associated with these modules and the measurement devices 102. Furthermore, the system controller 112 is interfaced with a controller 208 (shown in FIG. 2A) associated with the measurement device 102. The controller 208 controlling automation integration with the system 100 via the system controller 112. For example, movements of the transfer mechanism 110, transferring 3D objects to and from the measurement devices 102 and coating modules 104, performing process sequences, coordinating operations of the measurement devices 102, and so on, may be controlled by the system controller.

In operation, the system controller 112 enables feedback from each module and measurement device 102 to optimize 3D object throughput. The system controller 112 comprises a central processing unit (CPU) 114, a memory 116, and a support circuit 118. The CPU 114 may be one of any form of a general purpose computer processor that can be used in an industrial setting. The support circuit 118 is conventionally coupled to the CPU 114 and may comprise cache, clock circuits, input/output subsystems, power supplies, and the like. The software routines, when executed by the CPU 114, transform the CPU into a specific purpose computer (controller). The software routines may also be stored and/or executed by a second controller (not shown) that is located remotely from the measurement device 102.

Figure 2A:
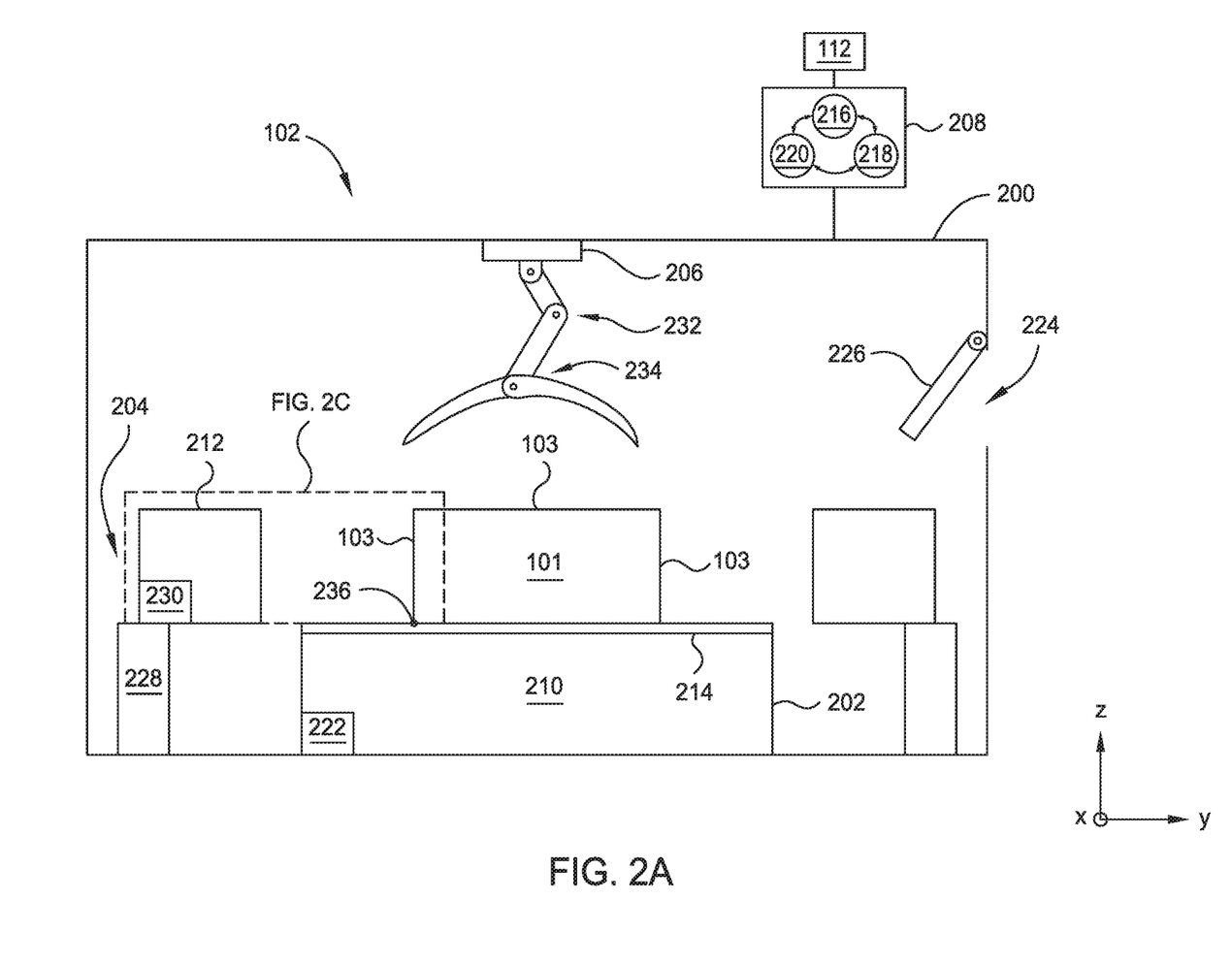
FIG. 2A is a schematic cross-sectional view of a non-destructive measurement according to an embodiment.
Figure 2B:
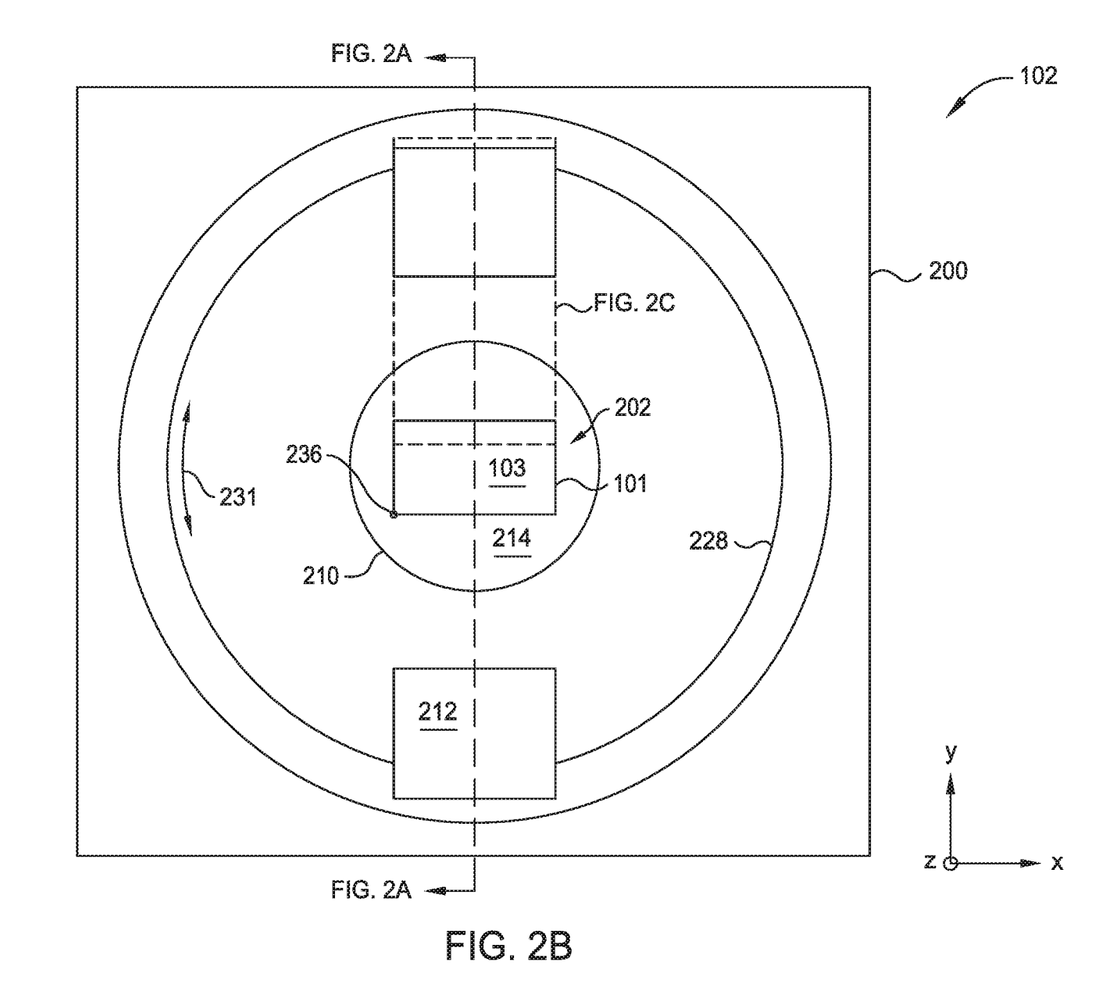
FIG. 2B is a schematic top view of a non-destructive measurement according to an embodiment.
Figure 2C:
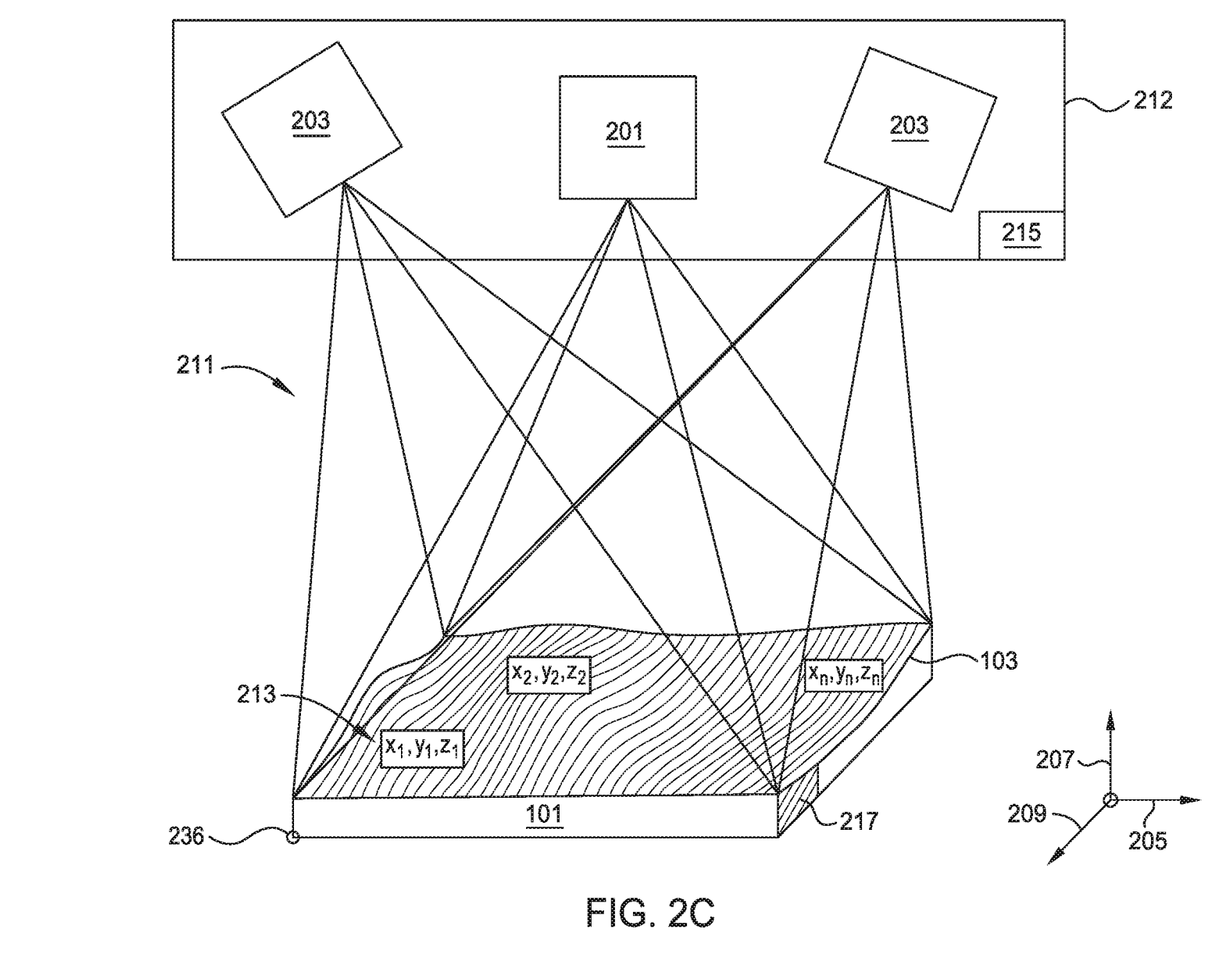
FIG. 2C is a schematic view of an image sensor system according to an embodiment.

FIG. 2A is a schematic cross-sectional view of a measurement device 102. FIG. 2B is a schematic top view of the measurement device 102. FIG. 2C is a schematic view of an image sensor system 212. In one embodiment, which can be combined with other embodiments described herein, the measurement device 102 is utilized for non-destructive methods of measuring coating thicknesses of 3D objects. The measurement device 102 includes a body 200, a stage assembly 202, an image sensor assembly 204, an alignment mechanism 206, and controller 208. The stage assembly 202 includes a stage 210 configured to retain an object 101. In one embodiment, which can be combined with other embodiments described herein, the object 101 is a three-dimensional (3D) object. In another embodiment, which can be combined with other embodiments described herein, the stage 210 is a goniometric stage and/or optical stage. The stage 210 is configured to rotate the object 101 about at least one of an x-axis, y-axis, and z-axis of the stage 210 to position one or more of surfaces 103 of the object 101 in relation to one or more image sensor systems 212 of the image sensor assembly 204. The stage 210 includes an actuator 222 that moves the stage 210 between a measurement position (as shown) and a transfer position. The actuator 222 facilitates object transfer to and from the measurement device 102 through an opening 224 formed though the body 200 and sealable by a door 226. In one embodiment, which can be combined with other embodiments described herein, the actuator 222 is operable to rotate the object 101 about at least one of the x-axis, y-axis, and z-axis of the stage 210. The stage 210 includes a coordinate grid 214 disposed thereon. The coordinate gird 214 is utilized for the non-destructive methods of measuring coating thicknesses of 3D objects described herein.

The controller 208 is coupled to the stage assembly 202, the one or more image sensor systems 212, and the alignment mechanism 206. The controller 208 includes a central processing unit (CPU) 216, a memory 218, and support circuits (or I/O) 220. The CPU 216 is one of any form of computer processors used in industrial settings for controlling various processes and hardware (e.g., goniometers, motors, and other hardware) and/or monitoring the processes (e.g., processing time and object 101 position). The memory 218 is connected to the CPU 216. The memory 218 is one or more of a readily available memory, such as random access memory (RAM), read only memory (ROM), floppy disk, hard disk, or any other form of digital storage, local or remote. Software instructions and data are coded and stored within the memory 218 for instructing the CPU 216. The support circuits 220 are also connected to the CPU 216 for supporting the processor in a conventional manner. The support circuits include conventional cache, power supplies, clock circuits, input/output circuitry, subsystems, and the like. A program (or computer instructions), which may be referred to as an imaging program, is readable by the controller determines which tasks are performable on the object 101. The program is software readable by the controller and includes code to monitor and control, for example, the processing time and object 101 position. In one embodiment, which can be combined with other embodiments described herein, the memory 218 includes image acquisition software, image analysis software, image numbering software to determine position and orientation of the object 101, a data base with part numbers and image information, each number corresponding to an object 101 and each image information corresponding to the object 101 of the part number, and/or software that outputs thickness of the object 101 and/or one or more surfaces 103 of the object 101.

The image sensor assembly 204 includes the image sensor systems 212. In one embodiment, which can be combined with other embodiments described herein, the image sensor assembly 204 includes each of the one or more image sensor systems 212 are in fixed positions oriented toward, i.e., facing the field of view 211 of the image sensor systems 212, a surface of the one or more surfaces 103 of the object 101. Therefore, rotation of the stage 210 and movement of the one or more image sensor systems 212 are not required for the non-destructive imaging methods described herein. In another embodiment, which can be combined with other embodiments described herein, the imaging sensor assembly 204 includes only one image sensor system 212 and the rotation of the stage 210 is utilized to position each of the one or more surfaces 103 in an orientation toward the image sensor system 212. In yet another embodiment, as shown, which can be combined with other embodiments described herein, the one or more image sensor systems 212 are operable to be oriented toward each of the one or more surfaces 103. For example, the one or more image sensor systems 212 are coupled a track 228 disposed in the body 200 and around a circumference 231 of the stage 210. In one embodiment, which can be combined with other embodiments described herein, the track 228 is a rail or cable. Each of the one or more image sensor systems 212 includes an actuator 230 that move the one or more image sensor systems 212 along the track 228 around the circumference 231 of the stage 210.

In embodiments described herein, which can be combined with other embodiments described herein, multiple 3D objects are coated utilizing the system 100 and the coating thickness of each of the multiple 3D objects are measured utilizing at least one non-destructive measurement device 102. The multiple 3D objects include different pluralities of 3D objects and the alignment mechanism 206 is operable to position each 3D object of each plurality of the different pluralities of 3D objects in substantially the same positon on the stage 210. Measuring the coating thickness each 3D object of each plurality of the different pluralities of 3D objects from substantially the same positon allows for part coordinates each 3D object of each plurality of the different pluralities of 3D objects to be in substantially the same positon. In one embodiment, which can be combined with other embodiments described herein, the alignment mechanism 206 includes an actuated arm mechanism 232 and a gripper 234. The actuated arm mechanism 232 and the gripper 234 allows the alignment mechanism 206 to capture the object 101 on the stage 210 and align the object 101 by positioning the object 101 at an alignment position 236 of coordinate gird 214 of the stage 210.

Referring to FIG. 1, the system 100 having the one or more integrated non-destructive measurement devices 102 may be utilized in concurrently with a non-destructive measurement method 500 for determining coating thickness of a 3D object. Multiple 3D objects are coated utilizing the system 100 and the coating thickness of each of the multiple 3D objects are measured utilizing at least one non-destructive measurement device 102. For example, an uncoated 3D object of a one of the pluralities of 3D objects is measured in a first measurement device and a coated 3D object of a one of the pluralities of 3D objects is measured in a second measurement device of the one or more integrated non-destructive measurement devices 102. Concurrently, 3D objects are coated in the one or more of coating modules 104. The system controller 112 controls movements of the transfer mechanism 110, transferring 3D objects to and from the measurement devices 102 and coating modules 104, and is interfaced with the controller 208 for performing the method 500.

The image sensor system 212 includes an illumination unit 201 and one or more image sensors 203. In one embodiment, which can be combined with other embodiments described herein, the one or more image sensors 203 are cameras. In a first configuration, also known as a time-of-flight configuration, the illumination unit 201 is configured to project one or more pulses of light, such as infrared light, on the one or more surfaces 103 of the object 101 without chemically or physically changing the one or more surfaces 103 of the object 101. Each of the one or more image sensors 203 coupled to the controller 208 having a timing mechanism determine the time-of-flight of the one or more pulses of light from the one or more surfaces 103 of the object 101 to each of the one or more image sensors 203. Determining the time-of-flight of the one or more pulses of light from the one or more surfaces 103 of the object 101 to each of the one or more image sensors 203 allows for z-axis positions $(z_1, z_2, \ldots, z_n)$ on a z-axis 207 of the one or more surfaces 103 to be determined to generate a 3D image of the one or more surfaces 103.

In a second configuration, also known as a structured light configuration, the illumination unit 201 is configured to project a fringe pattern on the one or more surfaces 103 of the object 101 without chemically or physically changing the one or more surfaces 103 of the object 101. The beams of light are reflected off the one or more surfaces 103 and one or more images are collected by the one or more image sensors 203. Each of the one or more image sensors 203 has a field of view 211. The distances between the beams of light captured in the one or more images collected by the one or more image sensors 203 allows for the z-axis positions $(z_1, z_2, \ldots, z_n)$ on a z-axis 207 of the one or more surfaces 103 to be determined to generate a 3D image of the one or more surfaces 103.

As shown in FIG. 2C, the surface 103 of the object 101 has at least one part coordinate 213. Each part coordinate 213 includes an x-position $(x_1, x_2, \ldots, x_n)$ on an x-axis 205 and a y-position $(y_1, y_2, \ldots, y_n)$ on an y-axis 209. The x-axis 205, y-axis 209, and z-axis 207 are relative the image sensor system 212 facing the surface 103. Thus, each of the one or more surfaces 103 has at least one part coordinate on the x-axis 205 and the y-axis 209 of the coordinate gird 214. The image sensor system 212 includes a Quick Response (QR) code reader 215 operable to read a QR code 217 disposed on the object 101. Each plurality of 3D objects of the pluralities of 3D objects has a different QR code 217. The image sensor system 212 is coupled to the controller 208 such that the QR code is provided to controller 208. The controller instructs the image sensor system 212 to determine the z-axis positions of each part coordinate 213 of the object 101 corresponding to the QR code 217.

Figure 3:
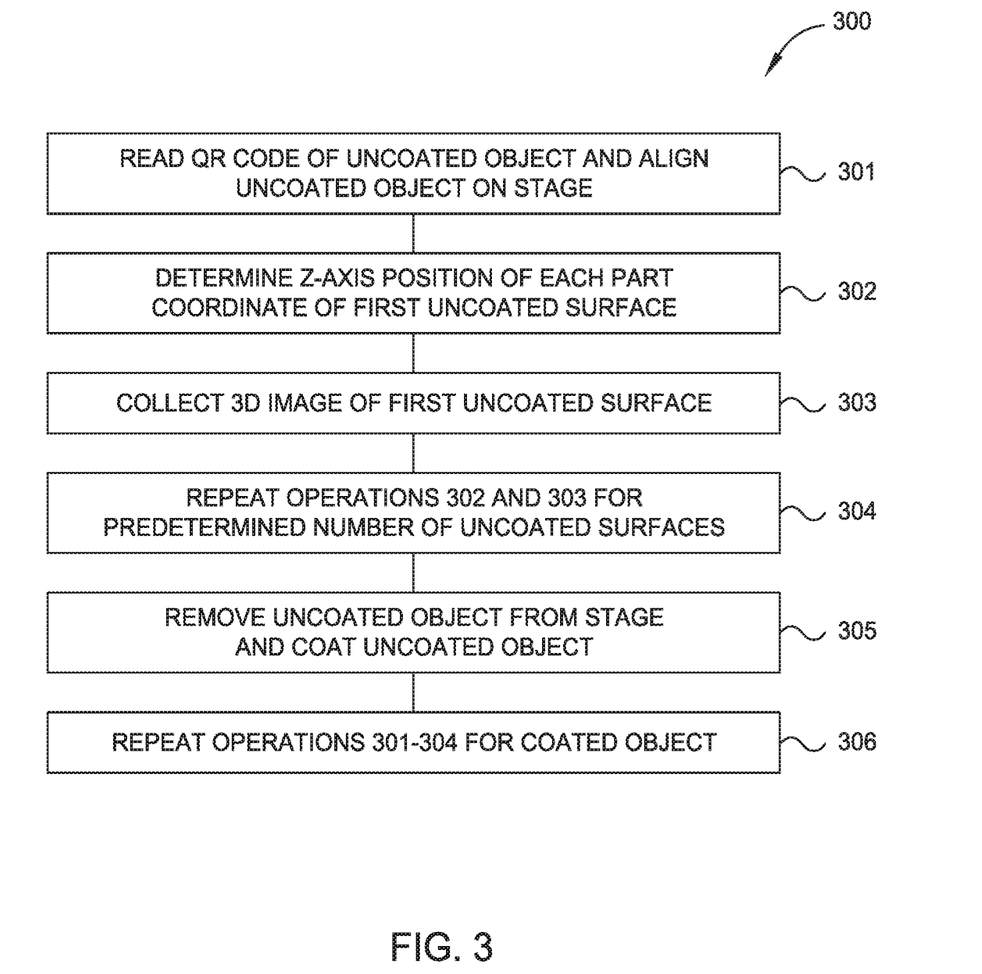
FIG. 3 is a flow diagram of a sub-method of a non-destructive measurement method for determining coating thickness of a 3D object according to an embodiment.

FIG. 3 is a flow diagram of a sub-method 300 of non-destructive measurement method 500 for determining coating thickness of a 3D object. In one embodiment, which can be combined with other embodiments described herein, the measurement device 102 is utilized for the sub-method 300. At operation 301, the QR code 217 of an uncoated object 101 is read by the QR reader 215 and the aligned on the stage 210 at the alignment position 236 corresponding to the QR code 217. At optional operation 302, the image sensor system 212 determines the z-axis position of each part coordinate 213 of a first uncoated surface of the object 101. At operation 303, a 3D image of the first uncoated surface of the object 101 is collected by the image sensor system 212. At operation 304, optional operation 302 and operation 303 are repeated for a predetermined number of uncoated surfaces. In one embodiment, which can be combined with other embodiments described herein, the image sensor assembly 204 includes each of the one or more image sensor systems 212 in fixed positions facing a surface of the one or more surfaces 103 of the object 101. Therefore, the z-axis positions are determined and 3D images are collected without rotating the object 101. In other embodiments, which can be combined with other embodiments described herein, the object 101 is rotated by the stage 210 and/or the one or more image sensor systems 212 are moved around the circumference 231 of the stage 210. At operation 305, the uncoated object 101 is removed from the stage 210 and coated. At operation 306, operations 301-304 are repeated for the coated object 101.

Figure 4:
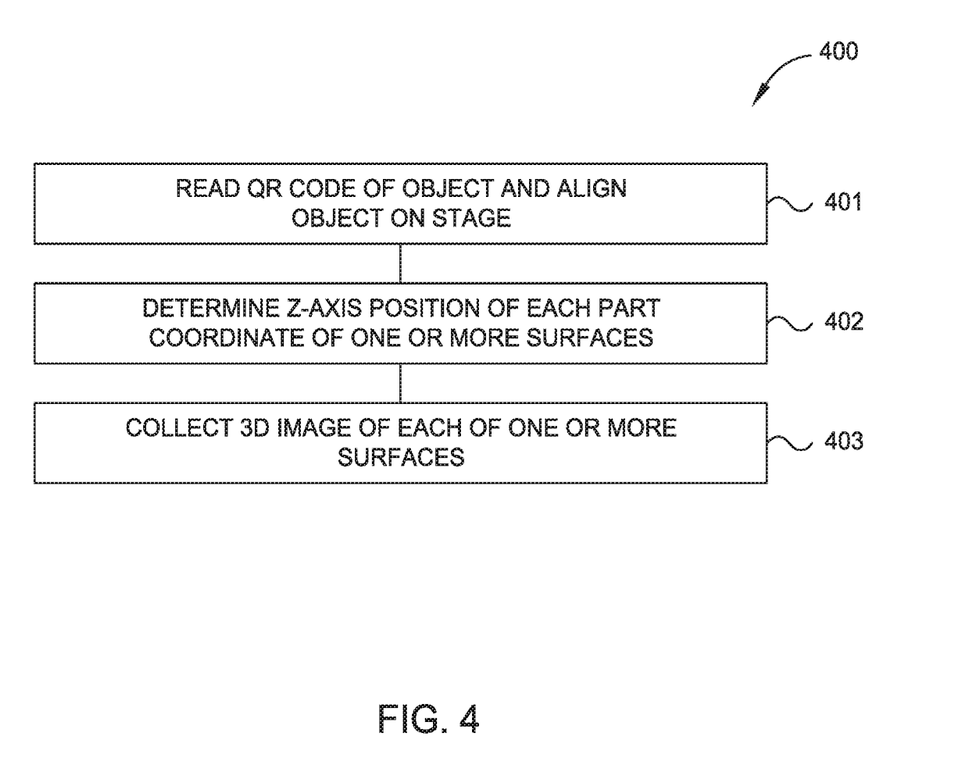
FIG. 4 is a flow diagram of a sub-method of a non-destructive measurement method for determining coating thickness of a 3D object according to an embodiment.

FIG. 4 is a flow diagram of a sub-method 400 of non-destructive measurement method 500 for determining coating thickness of a 3D object. In one embodiment, which can be combined with other embodiments described herein, the measurement device 102 is utilized for the sub-method 400. At operation 401, the QR code 217 of an object 101 is read by the QR reader 215 and the aligned on the stage 210 at the alignment position 236 corresponding to the QR code 217. The object 101 includes one or more surfaces 103. At optional operation 402, the image sensor system 212 determines the z-axis position of each part coordinate 213 of the one or more surfaces. At operation 403, a 3D image of each of the one or more surfaces 103 is collected. In one embodiment, which can be combined with other embodiments described herein, at least one surface of the one or more surfaces 103 is uncoated and at least one surface of the one or more surfaces is coated. In another embodiment, which can be combined with other embodiments described herein, at least one surface of the one or more surfaces 103 has a coated portion and an uncoated portion. In one embodiment, which can be combined with other embodiments described herein, the image sensor assembly 204 includes each of the one or more image sensor systems 212 in fixed positions facing the one or more surfaces 103 of the object 101. Therefore, the z-axis positions are determined and 3D images are collected without rotating the object 101. In other embodiments, which can be combined with other embodiments described herein, the object 101 is rotated by the stage 210 and/or the one or more image sensor systems 212 are moved around the circumference 231 of the stage 210.

Figure 5:
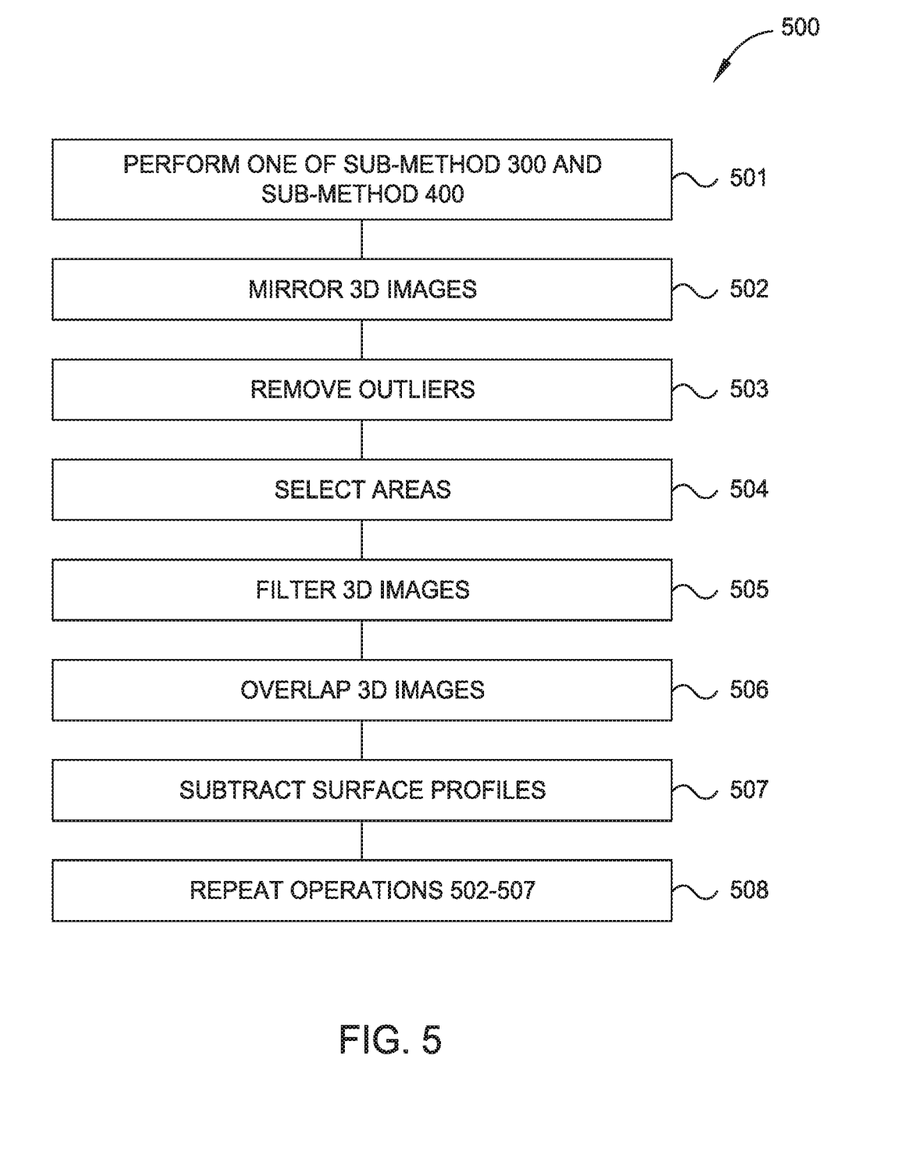
FIG. 5 is a flow diagram of a method for determining coating thickness of a 3D object.

FIG. 5 is a flow diagram of a method 500 for determining coating thickness of a 3D object. In one embodiment, which can be combined with other embodiments described herein, the measurement device 102 is utilized for the method 500. At operation 501, one of the sub-method 300 and the sub-method 400 are performed to collect one or more 3D images. In one embodiment, which can be combined with other embodiments described herein, one of the sub-method 300 and the sub-method 400 are performed to collect at least one first 3D image of an uncoated surface of the object 101 and at least one second 3D image of a coated surface of the object 101. In the embodiment, the uncoated surface and coated surface correspond to a same surface of the one or more surfaces 103 of the object 101. In another embodiment, which can be combined with other embodiments described herein, the sub-method 400 collects at least one first 3D image of a surface having an uncoated portion and a coated portion. The first 3D image include z-axis positions ($z_1$, $z_2$, . . . , $z_n$) on the z-axis 207 of the surface of the first 3D image. The second 3D image include z-axis positions ($z_1$, $z_2$, . . . , $z_n$) on the z-axis 207 of the surface of the second 3D image.

At optional operation 502, the one or more 3D images are mirrored in the z-axis 207. The mirrored one or more 3D images correspond to surface profiles. In one embodiment, which can be combined with other embodiments described herein, the first 3D image is mirrored in the z-axis 207 such that a mirrored 3D image corresponds to a first surface profile of the uncoated surface. In another embodiment, which can be combined with other embodiments described herein, the first 3D image is mirrored in the z-axis 207 such that a mirrored first 3D image corresponds to the first surface profile of the uncoated portion and a second surface profile of the coated portion of the surface. A mirrored second 3D image corresponds to the second surface profile of the coated surface. At operation 503, outliers of the one or more 3D images are removed. In one embodiment, which can be combined with other embodiments described herein, outliers the first 3D image and the second 3D image are removed. At optional operation 504, areas of the one or more 3D images are selected for operations 505-507. In one embodiment, which can be combined with other embodiments described herein, the first 3D image and the second 3D image are selected for operations 505-507. At operation 505, the one or more 3D images are filtered. In one embodiment, which can be combined with other embodiments described herein, the first 3D image and the second 3D image are filtered. In one embodiment, which can be combined with other embodiments described herein, the first 3D image and the second 3D image are filtered utilizing a Gaussian filter. Filtering the first 3D image and the second 3D image removes one of image noise and surface roughness.

At optional operation 506, the one or more 3D images are overlapped. In one embodiment, which can be combined with other embodiments described herein, the first 3D image and the second 3D image are overlapped. When the first 3D image includes the uncoated portion and the coated portion it is not necessary to overlap the first 3D image and the second 3D image because the second 3D image is not collected. At operation 507, the surface profiles of the one or more images are subtracted. In one embodiment, which can be combined with other embodiments described herein, the second surface profile is subtracted first surface profile to obtain a thickness of the coating. At optional operation 508, operations 502-507 are repeated. In one embodiment, which can be combined with other embodiments described herein, operations 502-507 are repeated for at least one subsequent first 3D image and at least one subsequent second 3D image collected from one of the sub-method 300 and the sub-method 400. In another embodiment, which can be combined with other embodiments described herein, operations 501-508 are repeated to collect and analyze one or more 3D images of additional surfaces.

In summation, a non-destructive measurement device measurement device and a non-destructive measurement method for determining coating thickness of a three-dimensional (3D) object are provided. The utilization non-destructive image collection methods in addition to the time-of-flight configuration and structured light configuration of the image sensor system allow for the determining coating thickness of a 3D object without chemically or physically changing the one or more surfaces of the object.

While the foregoing is directed to examples of the present disclosure, other and further examples of the disclosure may be devised without departing from the basic scope thereof, and the scope thereof is determined by the claims that follow

What is claimed is:

1. A method of determining a thickness of an object coating, comprising:
positioning an uncoated surface of an object in a field of view of at least one image sensor system in a non-destructive measurement device, the object having one or more surfaces;
reading a QR code corresponding to at least one part coordinate of the uncoated surface or corresponding to an alignment position of the uncoated surface in the non-destructive measurement device, the QR code disposed on the object;
determining a z-axis position of the at least one part coordinate of the uncoated surface;
collecting a first 3D image of the uncoated surface without chemically or physically changing the one or more surfaces of the object, the first 3D image corresponding to a first surface profile of the uncoated surface;
repeating the determining the z-axis position of the at least one part coordinate of the uncoated surface and the collecting the first 3D image for a predetermined number of uncoated surfaces;
positioning a coated surface of the object in the field of view of the at least one image sensor system;
collecting a second 3D image of the coated surface without chemically or physically changing the one or more surfaces of the object, the second 3D image corresponding to a second surface profile of the coated surface; and
analyzing the first 3D image and the second 3D image.

2. The method of claim 1, wherein the analyzing the second 3D image and the first 3D image comprises:
removing outliers of the first surface profile and the second surface profile;
filtering the first surface profile and the second surface profile;
overlapping the first surface profile and the second surface profile; and
subtracting the second surface profile from the first surface profile to obtain a thickness of a coating of the object.

3. The method of claim 2, wherein the analyzing the first 3D image and the second 3D image further comprises:
mirroring the first 3D image and the second 3D image; and
selecting a first area of the first 3D image and a second area of the second 3D image.

4. The method of claim 1, wherein the positioning a surface of the object in the field of view of the at least one image sensor system includes aligning the object on a stage of the non-destructive measurement device with an alignment mechanism of the non-destructive measurement device to align the object at the alignment position corresponding to the QR code.

5. The method of claim 1, wherein the at least one image sensor system comprises an illumination unit and one or more image sensors, and collecting a 3D image of a surface of the one or more surfaces comprises:
projecting one or more pulses of light to the surface of the object with the illumination unit; and
determining a time-of-flight of the one or more pulses of light with the one or more image sensors coupled to a controller having a timing mechanism.

6. The method of claim 1, wherein the image sensor system comprises an illumination unit and one or more image sensors, and collecting a 3D image of a surface of the one or more surfaces comprises:
projecting a fringe pattern onto the surface of the object with the illumination unit; and
collecting beams of light of the fringe pattern reflected off the surface of the object.

7. The method of claim 1, further comprising:
positioning a subsequent uncoated surface of the object in the field of view of the at least one image sensor system;
collecting a third 3D image of the subsequent uncoated surface without chemically or physically changing the one or more surfaces of the object, the third 3D image corresponding to a third surface profile of the subsequent uncoated surface;
positioning a subsequent coated surface of the object in the field of view of the at least one image sensor system;
collecting a fourth 3D image of the subsequent coated surface without chemically or physically changing the one or more surfaces of the object, the fourth 3D image corresponding to a fourth surface profile of the subsequent coated surface; and
analyzing the third 3D image and the fourth 3D image.

8. A method of determining a thickness of an object coating, comprising:
positioning a surface of an object in a field of view of at least one image sensor system in a non-destructive measurement device, the object having one or more surfaces and at least one surface having an uncoated portion and a coated portion;
reading a QR code corresponding to at least one part coordinate or an alignment position of the surface having the uncoated portion and the coated portion in the non-destructive measurement device, the QR code disposed on the object;
collecting a 3D image of the at least one surface having the uncoated portion and the coated portion without chemically or physically changing the one or more surfaces of the object, the 3D image corresponding to a first surface profile of the uncoated portion and a second surface profile of the coated portion; and
analyzing the 3D image.

9. The method of claim 8, wherein the analyzing the 3D image comprises:
removing outliers of the first surface profile and the second surface profile;
filtering the first surface profile and the second surface profile; and
subtracting the second surface profile from the first surface profile to obtain a thickness of a coating of the object.

10. The method of claim 9, wherein the analyzing the 3D image further comprises:
mirroring the 3D image; and
selecting an area of the 3D image.

11. The method of claim 8, wherein the image sensor system includes a QR code reader operable to read the QR code, and wherein positioning the surface of the object in the field of view of the at least one image sensor system includes aligning the object on a stage of the non-destructive measurement device with an alignment mechanism of the non-destructive measurement device to align the object at the alignment position.

12. The method of claim 11, wherein the collecting the 3D image of the surface includes determining a z-axis position of the at least one part coordinate.

13. The method of claim 8, wherein the at least one image sensor system comprises an illumination unit and one or more image sensors, and the collecting the 3D image of the surface of the one or more surfaces comprises:
  projecting one or more pulses of light to the surface of the object with the illumination unit; and
  determining a time-of-flight of the one or more pulses of light with the one or more image sensors coupled to a controller having a timing mechanism.

14. The method of claim 8, wherein the at least one image sensor system comprises an illumination unit and one or more image sensors, and the collecting the 3D image of the surface of the one or more surfaces comprises:
  projecting a fringe pattern onto the surface of the object with the illumination unit; and
  collecting beams of light of the fringe pattern reflected off the surface of the object.

15. The method of claim 8, wherein the analyzing the 3D image further comprises:
  mirroring the 3D image; and
  selecting an area of the 3D image.

16. The method of claim 8, further comprising:
  positioning a second surface of the object in the field of view of the at least one image sensor system, the second surface having a second uncoated portion and a second coated portion;
  collecting a second 3D image of the second surface without chemically or physically changing the one or more surfaces of the object, the second 3D image corresponding to a third surface profile of the second uncoated portion and a fourth surface profile of the second coated portion; and
  analyzing the second 3D image.

17. A non-destructive measurement device, comprising:
  a body;
  a stage assembly disposed in the body, the stage assembly comprising:
    a stage configured to retain an object; and
    a coordinate grid;
  an image sensor assembly disposed in the body, the image sensor assembly comprising:
    one or more image sensor systems, each of the one or more image sensor systems having an illumination unit, one or more image sensors, and a Quick Response (QR) code reader;
  an alignment mechanism disposed in the body, the alignment mechanism operable to align the object at an alignment position on the coordinate grid, the alignment position of an uncoated surface corresponding to a QR code of the object; and
  a controller coupled to the stage assembly, the image sensor assembly, and the alignment mechanism, the controller interfaced with a coating system and controlling automation integration with the coating system via a system controller of the coating system, the controller configured to:
    repeatedly instruct the one or more image sensor systems to determine a z-axis positon of at least one part coordinate of the uncoated surface corresponding to the QR code of the object and collect one or more 3D images for a predetermined number of surfaces of the object; and
    analyze the one or more 3D images to obtain a thickness of a coating of the object.

18. The device of claim 17, wherein each of the one or more image sensor systems comprises:
  an illumination unit to project one or more pulses of light a surface of the object; and
  one or more image sensors to determine a time-of-flight of the one or more pulses of light with a timing mechanism of the controller.

19. The device of claim 17, wherein each of the one or more image sensor systems comprises:
  an illumination unit to project a fringe pattern onto a surface of the object; and
  one or more image sensors to collect beams of light of the fringe pattern reflected off the surface of the object.

* * * * *